3,501,547
DEHYDROGENATION

George J. Nolan, Robert J. Hogan, and Floyd Farha, Jr., Bartlesville, Okla., assignors to Phillips Petroleum Company, a corporation of Delaware
No Drawing. Filed May 19, 1967, Ser. No. 639,617
Int. Cl. C07c 5/18; B01j 11/50
U.S. Cl. 260—680　　　　　　　　　　　　10 Claims

ABSTRACT OF THE DISCLOSURE

Dehydrogenation process using an improved catalyst formed from a phosphorus-containing compound such as phosphoric acid, a tin compound such as tin chloride, and one of boron, a boron-containing compound, bismuth, and a bismuth-containing compound.

---

This invention relates to a new and improved dehydrogenation catalyst and a dehydrogenation process using the improved catalyst.

Heretofore, oxidative dehydrogenation catalysts have been formed from phosphoric acid and tin oxide.

It has now been found that improved dehydrogenation catalysts can be formed from phosphoric acid or a phosphate as hereinafter defined, a tin compound such as a tin halide, and at least one of boron, a boron-containing compound as hereinafter defined, bismuth, and a bismuth-containing compound as hereinafter defined.

These new catalysts are useful for oxidatively dehydrogenating organic compounds such as alkenes, cycloalkenes, alkylpyridines, and alkylaromatics.

The products of the process and catalysts of this invention are unsaturated compounds such as isoprene, styrene, and 2-methyl-5-vinylpyridine which are useful as monomers for polymerization processes to make useful materials such as rubber (balls and tires), polystyrene, and the like.

Accordingly, it is an object of this invention to provide a new and improved dehydrogenation method.

It is another object of this invention to provide a new and improved catalyst useful in dehydrogenation processes.

Other aspects, objects and advantages will become apparent to those skilled in the art upon consideration of this disclosure.

By this invention a catalyst is formed from the combination of an alkali metal phosphate and/or phosphoric acid, at least one tin compound as hereinafter defined, and at least one of boron, a boron-containing compound as hereinafter defined, bismuth, and a bismuth-containing compound as hereinafter defined, each combined with the other in amounts that form a final composition effective as a catalyst for the oxidative dehydrogenation of materials specified hereinafter.

Substantially any phosphorus, tin, and bismuth- or boron-containing compounds can be employed in the catalyst so long as at least one of the compounds used contains oxygen, none of the compounds used is deleterious to dehydrogenation catalytic effects, and all the elements in the compounds used other than phosphorus, tin, oxygen, and bismuth or boron are volatilized by heating the catalyst to at least the temperature, at which the catalyst is used, e.g. at least 1,000° F., or are removed by washing the catalyst, e.g. with water.

The tin compound or compounds employed include any such compound soluble or disposable in water, alcohol, or ether. Suitable soluble tin compounds include both stannous or stannic compounds. Representative examples of suitable thin compounds are, for sake of brevity, given only as the stannic compound but it is to be understood that the corresponding stannous compound is equally as applicable. Representative examples include stannic halides (stannic fluoride, stannic chloride, stannic bromide, stannic iodide), stannic sulfate, stannic acetate, stannic oxide, stannic tartrate, and stannic nitrate.

Suitable phosphorus-containing compounds include, besides phosphoric acid, phosphorus pentoxide, lithium phosphate, sodium phosphate, potassium phosphate, rubidium phosphate, and cesium phosphate.

Suitable boron-containing compounds include ammonium biborate, i.e. $NH_4HB_4O_7$; ammonium tetraborate, i.e. $(NH_4)_2B_4O_7$; ammonium pentaborate, i.e. $NH_4B_5O_8$; pentaboric acid, i.e. $HB_5O_8$; tetraboric acid, i.e. $H_2B_4O_7$; boric oxide, i.e. $B_2O_3$; boric acid, i.e. $H_3BO_3$; and ammonium peroxy borate, i.e. $NH_4BO_3$.

Suitable bismuth-containing compounds include compounds containing either trivalent or pentavalent bismuth and are bismuth nitrates, bismuth halides, bismuth sulfates, bismuth oxalates, bismuth acetates, bismuth carbonates, bismuth propionates, and bismuth tartrates.

The phosphorus-containing compound or compounds, tin-containing compound or compounds, and boron or bismuth components can be combined in any conventional manner which will yield catalytic combinations suitable for conventional dehydrogenation processes. For example, the catalyst components can be combined using a coprecipitation technique as disclosed in detail hereinafter in the specific examples, by conventional aqueous or nonaqueous solution mixing, by ion exchange, by simply mixing the components by themselves without the use of additional solvents, and the like including combinations of these techniques.

Generally, the catalysts can be formed by mixing the components for periods of from about 1 minute to about 5 hours in the presence or absence of a solvent, at temperatures from about ambient, i.e. about 60° F., up to about 200° F. Ambient, sub-ambient, or super-ambient pressures, and ambient or inert atmospheres such as nitrogen, can be used.

Suitable solvents that can be employed for the combining of the catalyst components include water, alcohol, or ethers for the step of combining the tin compound and phosphorus compound, and these solvents as well as hydrocarbons, halogenated hydrocarbons, ketones, esters, and the like for any other steps of the catalyst preparation.

The catalyst itself when finished and in a condition for use in a dehydrogenation process will contain the following weight percentages of phosphorus, tin, and either bismuth or boron, based on the total weight of the final catalyst:

Phosphorus _____ 0.1–15
Tin _____ 15–65
Bismuth _____ 5–50
Boron _____ 1–5

The amounts of phosphorus, tin, and bismuth or boron present in the final catalyst can total less than 100 percent of the total weight of the catalyst, the difference between these totaled amounts and the 100 weight percent being substantially all combined oxygen.

A presently preferred method of making the catalyst of this invention is to mix solutions of, for example, the phosphates and/or phosphoric acid, one or more tin compounds, and at least one of ammonia, ammonium hydroxide, sodium hydroxide and potassium hydroxide, filter, wash to remove any undesirable electrolytes, dry, and calcine. A particle-forming step such as screening can precede or follow the drying step or calcining step.

The concentration of the various solutions that can be used to make the catalyst can vary widely, e.g. from about 0.01 to about 10 molar or more, depending on the solubility of the particular materials used. Any order of mixing can be used, and the final pH of the mixture is generally in the range of from about 2 to about 7, preferably from about 3.5 to about 6.5. The precipitate that forms is separated from the liquid by any conventional means such as filtration. Thereafter the precipitate is washed with dilute aqueous ammonium salt solutions such as ammonium acetate, ammonium nitrate, and the like, and/or with deionized water to remove electrolytes. The precipitate is then dried for from about 12 to about 24 hours at temperatures of from about 100 to about 300° F. in air or an inert atmosphere. The dried precipitate is then calcined from about 1 to about 24 hours at from about 1000 to about 1500° F., preferably at about the temperature at which the catalyst is to be used in the dehydrogenation process, under ambient or inert atmospheres. The drying and calcining steps remove water and other volatile materials from the catalyst and also preshrink the catalyst so that it will not shrink further when used in the dehydrogenation process and also serve to activate the catalyst. As mentioned before, the particle-forming step can precede or follow the drying or calcining step.

The dried and calcined tin-phosphorus combination is preferably formed into 1/16- to 1/2-inch pellets by compression molding or extrusion, or is simply screened to a desired size, such as 10–28 mesh (Tyler Sieve Series Mechanical Engineers Handbook by L. S. Marks, 4th edition, McGraw-Hill Book Co., Inc., New York, 1941, p. 836). Thereafter, the boron- or bismuth-containing compound or compounds is added by one of the techniques already described.

In a presently preferred method for preparing the boron-containing catalysts a boron compound such as ammonium borate is mixed with the tin-phosphorus material, and the resulting mixture is calcined.

In a presently preferred method for preparing the bismuth-containing catalysts solutions of a bismuth salt, phosphoric acid, and ammonia are simultaneously added to a rapidly-stirred suspension of tin-phosphorus material whose preparation has already been described, preferably at a constant pH of from about 5.5 to about 6.5. The resulting precipitate is then washed, dried, calcined, and formed as hereinbefore described.

Catalysts prepared in the manner described above can be used in any conventional dehydrogention, particularly oxidative dehydrogenation, process using conventional procedures and techniques. Suitable oxidative dehydrogenation processes are those which dehydrogenate at least one material selected from the group consisting of alkenes, cycloalkenes, alkylpyridines, and alkylaromatics, using an elevated temperature, and a molecular oxygen-containing gas, with or without the presence of steam. The alkenes can contain from 3 to 10, preferably 4 to 6, carbon atoms per molecule, inclusive, and the cycloalkenes can contain from 4 to 10, preferably 4 to 6, carbon atoms per molecule, inclusive. The alkylpyridines and alkylaromatics can contain from 1 to 4, preferably 1 to 2, alkyl groups per molecule which themselves contain from 1 to 6, preferably 4 to 6, carbon atoms per group, inclusive, with at least one alkyl group having at least 2 carbon atoms.

Examples of suitable materials include propylene, n-butene, n-pentene, isopentenes, octenes, decenes, and the like. Also included are alkyl-substituted and unsubstituted cycloalklenes such as cyclobutene, cyclopentene, cyclohexene, 3-isopentylcyclopentene, and the like. Other materials include ethylbenzene, propylbenzene, n-butylbenzene, isobutylbenzene, hexylbenzene, 1-methyl-2-propylbenzene, 1-butyl-2-hexylbenzene, and the like. Still other materials include ethylpyridine, 2-methyl-5-ethylpyridine, 2,3,4-trimethyl-5-ethylpyridine, 2 - ethyl-5-hexylpyridine, and the like.

Preferred reactions applicable to this invention are the formation of 1,3-butadiene from butenes, 1,3-pentadiene from pentenes, isoprene from 2-methyl-butenes, styrene from ethylbenzene, and 2-methyl-5-vinylpyridine from 2-methyl-5-ethylpyridine.

The catalysts of this invention can be used in the form of granules, mechanically formed pellets, or any other conventional form for a catalyst. The catalysts can also be employed with suitable supporting or diluting materials such as alumina (preferably eta or gamma or mixtures thereof), boria, beryllia, magnesia, titania, zirconia, and similar conventional materials known in the art.

The amount of catalyst employed will vary widely depending on the mtaerials present and the conversion and selectivity desired, but generally the amount will be that which, for the given reaction, is an effective catalytic amount to produce the desired dehydrogenation results.

The molecular oxygen-containing gas employed can be present as such or with inert diluents such as nitrogen and the like. Suitable molecular oxygen-containing gases include air, flue gases containing residual oxygen, and the like. Pure or substantially pure oxygen can also be employed if desired.

The operating conditions for the process of this invention can vary widely but will generally include a temperature from about 700 to about 1300° F., preferably from about 800 to about 1200° F.; a pressure from about 0.05 to about 250, preferably from about 0.1 to about 25 p.s.i.a.; an oxygen to gaseous organic compound feed volume ratio of from about 0.1/1 to about 3/1, preferably from about 0.5/1 to about 2/1; and, if steam is used, a steam to organic compound feed volume ratio of 0.1/1 to 50/1, preferably 5/1 to 20/1. The organic compound feed space rate (volumes organic compound vapor/volume of catalyst/hour, 32° F., 15 p.s.i.a.) can be from about 50 to about 5000, preferably from about 100 to about 2500.

The process of this invention is ordinarily carried out by forming a mixture, preferably preheated, of organic compound feed steam, if used, and oxygen and/or oxygen-containing gases and passing this mixture over the catalyst at the desired temperature. Recycle of unconverted organic compound feed can be employed if desired; however, the conversion rates and selectivity of this invention are generally sufficiently high to justify a single pass operation, if, for example, the product streams can be used without separation steps in a subsequent operation, such as polymerization.

EXAMPLE I

A control catalyst was formed by mixing 4 liters of an aqueous ammonium hydroxide solution containing 1500 ml. of ammonium hydroxide, 9 liters of an aqueous solution of stannic chloride containing 4 lbs. of $SnCl_4 \cdot 5H_2O$, and 1000 ml. of an aqueous solution of phosphoric acid containing 335 g. of 85 percent $H_3PO_4$. The pH of the final mixture was about 4.5. The precipitate formed in the final mixture was separated from the liquid by filtering, washed twice with 0.5-molar ammonium nitrate, and finally with 16 liters of 0.1-molar ammonium nitrate. The washed precipitate was then dried at a temperature of 300° F. and ambient pressure. The dried catalyst was calcined 10 hours at 1100° F. and ambient pressure. Thereafter, the calcined catalyst was screened to obtain catalyst particles in the range of from 20 to 28 mesh.

One portion of the thus formed catalyst was used as such as a control catalyst. Two other portions were modified by addition of a boron compound to represent a catalyst of this invention. To these portions of the catalyst was added finely-divided ammonium biborate

equivalent to 1 and 3 weight percent boron in the total catalyst, respectively. The second and third portions of the control catalyst were then ground to −60 mesh, formed into a paste with a small amount of deionized water, dried at 160° C., formed into 0.5″ pellets, calcined for 4 hours at 1100° F. and atmospheric atmosphere, and ground to 20 to 28 mesh particle size. Each of the three portions of catalyst was tested for butene-2 dehydrogenation at atmospheric pressure and a furnace temperature of 1000° F. The dehydrogenation tests were carried out using the following gas flow rates:

Table I

| | Space rate [1] |
|---|---|
| Butenes-2 | 200 |
| Air | 1000 |
| Steam | 2200–2700 |

[1] Volumes of vapor/volume of catalyst per hour at 32° F. and 15 p.s.i.

Results of the test and the composition of the catalyst employed were as follows:

ionized water. Solution E was made by dissolving 200 ml. of concentrated $NH_4OH$ in 500 ml. of deionized water. The weights of the indicated chemicals used in solutions A, B, C, and D for each of the four catalysts were:

| | Amount of chemical used, grams | | | |
|---|---|---|---|---|
| Solution | A | B | C | D |
| Chemical | $SnCl_4 \cdot 5H_2O$ | 85% $H_3PO_4$ | $Bi(NO_3)_3 \cdot 5H_2O$ | 85% $H_3PO_4$ |
| Invention catalyst: | | | | |
| First portion | 135 | 8.9 | 74 | 4.8 |
| Second portion | 169 | 11.2 | 41 | 6.0 |
| Third portion | 84 | 13.4 | 114 | 7.0 |
| Fourth portion | 120 | 20.0 | 71 | 10.7 |

In the preparation of the catalysts solutions A and B were mixed and concentrated $NH_4OH$ was added to a pH of 6. To this rapidly-stirred slurry solutions C, D, and E were added, adjusting the addition rate of solution E to maintain a constant pH of 6. The resulting precipitates were filtered, washed once with 3 liters of 0.5-molar $NH_4NO_3$ solution, then with 2 liters of deionized water. They were dried overnight at 320° F. in air and for 3 hours at 1100° F. in nitrogen, and ground to 20 to 28 mesh.

The control catalyst and each of the four invention catalysts were tested for butene-2 dehydrogenation at

TABLE II

| Catalyst | Phosphorus content based on total catalyst | Tin content, wt. percent based on total catalyst | Boron content, wt. percent based on total catalyst |
|---|---|---|---|
| Control portion | 9 | 60 | 0 |
| 1st ammonium biborate portion | 8.9 | 59 | 1 |
| 2nd ammonium biborate portion | 8.7 | 58 | 3 |

| | Time in dehydrogenation period | | | | | |
|---|---|---|---|---|---|---|
| | 0.25 hour | | 1 hour | | 3 hours | |
| Catalyst | Conversion* | Butadiene yield* | Conversion* | Butadiene yield* | Conversion* | Butadiene yield* |
| Control portion | 94 | 87 | 81 | 67 | 70 | 54 |
| 1st ammonium biborate portion | 99 | 88 | 98 | 81 | 87 | 64 |
| 2nd ammonium biborate portion | 100 | 88 | 99 | 82 | 93 | 70 |

*Conversion and butadiene yield are expressed as moles per 100 moles of butene-2 in the feed.

These data show that both conversion and butadiene yield were higher with the catalyst of the invention. This makes possible both the use of considerably longer dehydrogenation periods and an increased yield of butadiene during those dehydrogenation periods.

EXAMPLE II

A control tin-phosphorus catalyst was prepared in the same manner as that set forth for the control catalyst of Example I. Four bismuth-tin-phosphorus catalysts were prepared in exactly the same way, each portion having a different bismuth content. Five solutions (A, B, C, D, and E) were prepared for use in the preparation of each bismuth-containing catalyst. Solution A prepared by dissolving different amounts of $SnCl_4 \cdot 5H_2O$ in 1000 ml. of deionized water. Solution B was prepared by dissolving different amounts of 85 percent $H_3PO_4$ in 1000 ml. of deionized water. Solution C was prepared by dissolving different amounts of $Bi(NO_3)_3 \cdot 5H_2O$ in 500 ml. of 20 percent $HNO_3$. Solution D was prepared by dissolving different amounts of 85 percent $H_3PO_4$ in 500 ml. of deatmospheric pressure and a temperature of 1000° F. using the following gas flow rates:

Table III

| | Space rate [1] |
|---|---|
| Butene-2 | 200 |
| Air | 1000 |
| Steam | [2] 2400 |

[1] Volumes of vapor/volume of catalyst per hour at 32° F. and 15 p.s.i.
[2] Space rate for control catalyst was 2500.

The composition of the catalysts employed and the results of the dehydrogenation tests determined after 3 hours on steam are as follows:

TABLE IV

| Catalyst | Phosphorus content, wt. percent based on total catalyst | Tin content, wt. percent based on total catalyst | Bismuth content, wt. percent based on total catalyst | Butene conversion* | Butadiene yield* |
|---|---|---|---|---|---|
| Control | 9 | 60 | 0 | 70 | 55 |
| 1st portion invention catalyst | 2.8 | 46 | 19 | 87 | 68 |
| 2nd portion invention catalyst | 4.3 | 57 | 13.9 | 91 | 74 |
| 3rd portion invention catalyst | 5.3 | 28 | 37.6 | 97 | 77 |
| 4th portion invention catalyst | 7.7 | 40 | 27.0 | 93 | 71 |

*Both butene conversion and butadiene yield are expressed in moles per 100 moles butene-2 in the feed.

From Table IV it can be seen that both conversion and butadiene yield were higher with the catalysts of this invention. This makes possible both the use of considerably longer dehydrogenation periods and an increased yield of butadiene during those dehydrogenation periods.

Reasonable variation and modification are possible within the scope of this invention without departing from the spirit and scope thereof.

That which is claimed is:

1. An oxidative dehydrogenation catalyst composition consisting essentially of that formed by combining under dehydrogenation catalyst forming conditions effective catalyst forming amounts of (1) at least one phosphorus-containing compound; (2) at least one tin-containing compound; (3) at least one of boron, a boron-containing compound, bismuth, and a bismuth-containing compound; at least one of said phosphorus-, tin-, and boron- or bismuth-containing compounds contains oxygen, none of said compounds are deleterious to dehydrogenation catalytic effects, and removing all the elements in said compounds other than phosphorus, tin, oxygen, and boron or bismuth by volatilizing by heating the catalyst at least to the temperature at which the catalyst is used in a dehydrogenation process or by washing the catalyst with a liquid that is non-deleterious to the catalytic effects of the catalyst, said boron and boron-containing compounds being employed in amounts sufficient to add to the final catalyst from about 1 to about 5 weight percent boron based on the total weight of the final catalyst, said bismuth and bismuth-containing compounds being employed in amounts sufficient to add to the final catalyst from about 5 to about 50 weight percent bismuth based on the total weight of the final catalyst.

2. The catalyst according to claim 1 wherein the phosphorus-containing compound or compounds are alkali metal phosphates, phosphorus pentoxide, and phosphoric acid and are employed in an amount sufficient to add to the final catalyst from about 0.1 to about 15 weight percent phosphorus based on the total weight of the final catalyst, the tin compound or compounds are tin halide, tin sulfate, tin acetate, tin oxide, tin tartrate, and tin nitrate, employed in an amount sufficient to add to the final catalyst from about 15 to about 65 weight percent tin based on the total weight of the final catalyst, and the boron- and bismuth-containing compounds are ammonium biborate, boron ammonium tetraborate, ammonium pentaborate, pentaboric acid, tetraboric acid, boric acid, boric oxide, ammonium peroxy borate, bismuth, bismuth nitrate, bismuth halide, bismuth sulfate, bismuth oxalate, bismuth acetate, bismuth carbonate, bismuth propionate, and bismuth tartrates.

3. The catalyst according to claim 1 wherein said catalyst is formed from a combination of phosphoric acid, stannic chloride, and ammonium biborate, and wherein the combining of these materials is carried out by mixing same for from about 1 minute to about 5 hours at from about ambient to about 200° F. under an ambient or inert atmosphere.

4. A catalyst composition according to claim 1 wherein said catalyst is formed from a combination of phosphoric acid, stannic chloride, and bismuth nitrate, these materials being combined by mixing for from about 1 minute to about 5 hours at a temperature of from about ambient to about 200° F.

5. In an oxidative dehydrogenation process that employs a tin-phosphorus catalyst, the improvement comprising employing a catalytic dehydrogenation amount of the catalyst of claim 1.

6. A method according to claim 5 wherein the catalyst employed has a composition wherein the phosphorus-containing compound or compounds are alkali metal phosphates, phosphorus pentoxide, and phosphoric acid, and are employed in an amount sufficient to add to the final catalyst from about 0.1 to about 15 weight percent phosphorus based on a total weight of the final catalyst, the tin compound or compounds are tin halide, tin sulfate, tin acetate, tin oxide, tin tartrate, and tin nitrate, employed in an amount sufficient to add to the final catalyst from about 15 to about 65 weight percent tin based on the total weight of the final catalyst, and the boron- and bismuth-containing compounds are ammonium biborate, boron ammonium tetraborate, ammonium pentaborate, pentaboric acid, tetraboric acid, boric acid, boric oxide, ammonium peroxy borate, bismuth, bismuth nitrate, bismuth halide, bismuth sulfate, bismuth oxalate, bismuth acetate, bismuth carbonate, bismuth propionate, and bismuth tartrates and the dehydrogenation process is carried out using a temperature from about 700 to about 1300° F., a pressure of from about 0.05 to about 250 p.s.i.a., an oxygen to gaseous dehydrogenation feed volume ratio of from about 0.1/1 to about 3/1, and a dehydrogenation feed space rate in volumes of dehydrogenation feed vapor per volume of catalyst per hour at 32° F. and 15 p.s.i.a. of from about 50 to about 5000.

7. A method according to claim 5 wherein said catalyst is formed from a combination of phosphoric acid, tin halide, and a compound selected from the group consisting of boron, ammonium biborate, ammonium tetraborate, ammonium pentaborate, pentaboric acid, tetraboric acid, boric acid, boric oxide, and ammonium peroxy borate.

8. A method according to claim 5 wherein said catalyst is formed from a combination of phosphoric acid, tin halide, and a compound selected from the group consisting of bismuth, bismuth nitrate, bismuth halide, bismuth sulfate, bismuth oxalate, bismuth carbonate, bismuth propionate, and bismuth tartrate, and the catalyst is used to oxidatively dehydrogenate at least one butene to butadiene.

9. A method according to claim 5 wherein the catalyst employed is formed from a combination of phosphoric acid, stannic chloride, and ammonium biborate, and wherein the combining of these materials is carried out by mixing same for from about 1 minute to about 5 hours at from about ambient to about 200° F. under an ambient or inert atmosphere.

10. A method according to claim 5 wherein the catalyst employed is formed from a combination of phosphoric acid, stannic chloride, and bismuth nitrate, these materials being combined by mixing for from about 1 minute to about 5 hours at a temperature of from about ambient to about 200° F.

References Cited

UNITED STATES PATENTS

| | | | |
|---|---|---|---|
| 2,991,321 | 7/1961 | Voge et al. | 260—680 |
| 3,161,670 | 12/1964 | Adams et al. | 260—680 X |
| 3,248,340 | 4/1966 | Callahan et al. | 252—437 X |
| 3,269,957 | 8/1966 | Bethell | 252—437 |
| 3,274,283 | 9/1966 | Bethell | 260—680 |
| 3,320,329 | 5/1967 | Nolan | 260—680 |

PAUL M. COUGHLAN, Jr., Primary Examiner

U.S. Cl. X.R.

252—432, 437; 260—696